US010100381B2

(12) United States Patent
Miyoshi et al.

(10) Patent No.: US 10,100,381 B2
(45) Date of Patent: Oct. 16, 2018

(54) STEEL SHEET FOR HOT PRESSING AND PROCESS FOR MANUFACTURING HOT PRESSED MEMBER USING THE STEEL SHEET (75) Inventors: Tatsuya Miyoshi, Tokyo (JP); Seiji Nakajima, Tokyo (JP); Hiroki Nakamaru, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 467 days.

(21) Appl. No.: 14/123,872

(22) PCT Filed: May 23, 2012

(86) PCT No.: PCT/JP2012/063824
§ 371 (c)(1),
(2), (4) Date: Dec. 4, 2013

(87) PCT Pub. No.: WO2012/169389
PCT Pub. Date: Dec. 13, 2012

(65) Prior Publication Data
US 2014/0120365 A1 May 1, 2014

(30) Foreign Application Priority Data
Jun. 7, 2011 (JP) ................................ 2011-126863
Jun. 7, 2011 (JP) ................................ 2011-126941

(51) Int. Cl.
*C21D 8/02* (2006.01)
*B32B 15/00* (2006.01)
*C23C 28/00* (2006.01)
*B32B 15/04* (2006.01)
*C23C 28/02* (2006.01)
*B32B 15/01* (2006.01)
*C22C 18/00* (2006.01)
*C22C 38/02* (2006.01)
*C22C 38/04* (2006.01)
*C22C 38/28* (2006.01)
*C22C 38/32* (2006.01)
*C22C 38/60* (2006.01)
*C25D 5/36* (2006.01)
*C25D 5/50* (2006.01)
*C25D 7/06* (2006.01)
(Continued)

(52) U.S. Cl.
CPC .......... *C21D 8/0242* (2013.01); *B32B 15/013* (2013.01); *B32B 15/04* (2013.01); *B32B 15/043* (2013.01); *C21D 8/0205* (2013.01); *C22C 18/00* (2013.01); *C22C 38/02* (2013.01); *C22C 38/04* (2013.01); *C22C 38/28* (2013.01); *C22C 38/32* (2013.01); *C22C 38/60* (2013.01); *C23C 28/00* (2013.01); *C23C 28/02* (2013.01); *C23C 28/021* (2013.01); *C23C 28/025* (2013.01); *C23C 28/322* (2013.01); *C23C 28/3225* (2013.01); *C23C 28/34* (2013.01); *C25D 5/36* (2013.01); *C25D 5/50* (2013.01); *C25D 7/0614* (2013.01); *C21D 1/673* (2013.01); *C25D 3/562* (2013.01); *Y10T 428/12549* (2015.01); *Y10T 428/12569* (2015.01); *Y10T 428/12757* (2015.01); *Y10T 428/12799* (2015.01); *Y10T 428/12806* (2015.01); *Y10T 428/12972* (2015.01); *Y10T 428/12979* (2015.01); *Y10T 428/2495* (2015.01); *Y10T 428/27* (2015.01); *Y10T 428/273* (2015.01)

(58) Field of Classification Search
CPC ....... C23C 28/00; C23C 28/02; C23C 28/021; C23C 28/025; C23C 28/3225; C23C 28/322; C23C 28/34; B32B 15/013; B32B 15/04; B32B 15/043; B32B 15/18; C22C 18/00; C22C 38/02; C22C 38/04; C22C 38/28; C22C 38/32; C22C 38/60; Y10T 428/12569; Y10T 428/12549; Y10T 428/12972; Y10T 428/12979; Y10T 428/12799; Y10T 428/12757; Y10T 428/12806; Y10T 428/2495; Y10T 428/27; Y10T 428/273
See application file for complete search history.

(56) References Cited

U.S. PATENT DOCUMENTS 5,525,431 A 6/1996 Kanamaru et al.
6,143,422 A * 11/2000 Nagai ................ C23C 22/24
428/223

(Continued)

FOREIGN PATENT DOCUMENTS

CN 1524133 8/2004
EP 2 418 303 2/2012
(Continued)

OTHER PUBLICATIONS

Machine Translation, Maki, JP 2005-113233, Apr. 2005.*
(Continued)

Primary Examiner — Michael E. La Villa
(74) Attorney, Agent, or Firm — RATNERPRESTIA (57) ABSTRACT A hot-pressing steel sheet has excellent oxidation resistance to be capable of suppressing the formation of scales and ZnO during hot pressing as well as is excellent in cold pressing properties. A process of manufacturing a hot pressed member uses the steel sheet. The hot-pressing steel sheet includes a coating layer containing 10 to 25 mass % of Ni and a balance of Zn and inevitable impurities and having a mass per unit area of 10 to 90 g/m², and a lubricating layer containing a solid lubricant, in the order named on the surface of a steel sheet.

21 Claims, 1 Drawing Sheet (51) Int. Cl.
*C21D 1/673* (2006.01)
*C25D 3/56* (2006.01)

(56) References Cited

U.S. PATENT DOCUMENTS

| | | | |
|---|---|---|---|
| 6,652,728 | B1 | 11/2003 | Sonntag et al. |
| 9,040,166 | B2 | 5/2015 | Nakamaru et al. |
| 2005/0221108 | A1 | 10/2005 | Higai et al. |
| 2012/0321903 | A1* | 12/2012 | Nakamaru ............ B32B 15/013 428/450 |

FOREIGN PATENT DOCUMENTS

| | | | |
|---|---|---|---|
| EP | 2 602 359 | | 6/2013 |
| GB | 1 490 535 | | 11/1977 |
| JP | 2000-144444 | | 5/2000 |
| JP | 2001-026899 | * | 1/2001 |
| JP | 2003-073774 | | 3/2003 |
| JP | 2004-124207 | A | 4/2004 |
| JP | 2005-113233 | * | 4/2005 |
| JP | 3663145 | B2 | 4/2005 |
| JP | 2005-240072 | A | 9/2005 |
| JP | 4039548 | B2 | 11/2007 |
| JP | 2010-77498 | | 4/2010 |
| JP | 2011-032497 | | 2/2011 |
| JP | 2011-074409 | A | 4/2011 |
| WO | 2010/114170 | | 10/2010 |
| WO | WO 2011/052797 | * | 5/2011 |

OTHER PUBLICATIONS

Machine Translation, Hiroyuki et al., JP 2001-026899, Jan. 2001.*
Supplemental European Search Report dated Dec. 9, 2014 from corresponding European Application No. 12796728.9.
Korean Office Action dated Dec. 19, 2016, of corresponding Korean Application No. 10-2014-7015264, along with a Concise Statement of Relevance of Office Action in English.
European Communication dated Jan. 27, 2017, of corresponding European Application No. 12796728.9.
Non Final Office Action for U.S. Appl. No. 14/680,302, dated Sep. 22, 2017, 23 pages.
Final Office Action for U.S. Appl. No. 14/094,003, dated Nov. 7, 2017, 16 pages.
European Communication for European Application No. 12 796 728.9, dated Mar. 28, 2018, 5 pages.
Non Final Office Action for U.S. Appl. No. 14/094,003, dated May 24, 2018, 17 pages.
Chinese Office Action dated Jul. 14, 2017, of corresponding Chinese Application No. 201610269427.0, along with a Search Report in English.

* cited by examiner

SAMPLE SLIDING DIRECTION

STEEL SHEET FOR HOT PRESSING AND PROCESS FOR MANUFACTURING HOT PRESSED MEMBER USING THE STEEL SHEET

TECHNICAL FIELD

This disclosure relates to steel sheets for hot pressing that are suited for the manufacture of members such as vehicle chassis members, suspension members and body structure members by hot pressing, and to processes for manufacturing hot pressed members using the steel sheets.

BACKGROUND

Many vehicle members such as vehicle chassis members and body structure members have heretofore been manufactured by pressing steel sheets having a prescribed strength. From the viewpoint of preserving the global environment, there has recently been a great need for vehicle bodies to be reduced in weight. Efforts are being made to strengthen steel sheets that are used, thereby reducing the thickness of the sheets. However, steel sheets deteriorate in terms of press formability as the strength of the steel sheets increases. Thus, it is becoming increasingly difficult to fabricate a steel sheet into a shape of a desired member.

Great Britain Patent No. 1490535 proposes a processing technique called hot pressing, in which a steel sheet that has been heated is deformed with a mold including a die and a punch and is simultaneously cooled rapidly, thus enabling easy processing and achieving an increase in strength. However, the hot pressing technique has a problem in that because a steel sheet is heated to a high temperature of about 950° C. before being hot pressed, scales (iron oxide) are formed on the surface of the steel sheet and come off during hot pressing to damage the mold or roughen the surface of the hot pressed member. Further, scales remaining on the surface of the member can make the appearance unsatisfactory or can lower the adhesion to a coating. To remedy such problems, scales on the surface of members are usually removed by performing a treatment such as acid cleaning or shot blasting. Because of the need for such a treatment, however, production steps become complicated and productivity is lowered. Although vehicle members such as vehicle chassis members and body structure members are required to be excellent in terms of corrosion resistance, hot pressed members manufactured through steps such as those described above are very poor in terms of corrosion resistance because they are not provided with any rust preventive layers such as deposited coatings.

To cope with such problems, a hot pressing technique is desired by which scales can be prevented from being generated during heating before hot pressing and the corrosion resistance of hot pressed members can be improved. With regard to this, there have been proposed steel sheets having a coating such as a deposited coating layer on the surface, as well as hot pressing processes using such steel sheets. For example, Japanese Patent No. 3663145 discloses a process for the manufacture of a hot pressed member with excellent corrosion resistance, in which a steel sheet coated with Zn or a Zn-based alloy is hot pressed such that a Zn—Fe-based compound or a Zn—Fe—Al-based compound is formed on the surface of the product. Japanese Patent No. 4039548 discloses a hot pressed product (member) with excellent formability, weldability and corrosion resistance that is obtained by heating a galvannealed steel sheet at 700 to 1000° C. for 2 to 20 minutes and hot pressing the steel sheet to form a coating layer containing a Fe—Zn solid solution phase on the surface of the product.

Hot pressed members manufactured according to the process of JP '145, however, have a defective appearance and exhibit a low adhesion to a coating due to the occurrence of scales. Further, the corrosion resistance can be degraded as a result of the formation of ZnO. Furthermore, hot pressed members described in JP '145 and JP '548 have poor resistance to corrosion perforation that is apt to be caused at a region in which a chemical conversion coating or an electrodeposition coating cannot be deposited with high throwing power (hereinafter, referred to as corrosion perforation resistance).

Further, another hot pressing technique has been recently examined in which a steel sheet is cold pressed into a desired shape prior to hot pressing. Accordingly, hot-pressing steel sheets have been increasingly required to exhibit excellent cold pressing properties.

It could therefore be helpful to provide a hot-pressing steel sheet excellent in oxidation resistance to be capable of suppressing the formation of scales and ZnO during hot pressing as well as is excellent in cold pressing properties, and to provide a process for manufacturing a hot pressed member using the steel sheet.

It could also be helpful to provide a hot-pressing steel sheet which is excellent in corrosion perforation resistance after being hot pressed as well as is excellent in cold pressing properties, and to provide a process for manufacturing a hot pressed member using the steel sheet.

SUMMARY

We discovered the following:

i) Scales are apt to be formed in defective portions on a coating layer and in local portions such as cracks that have occurred starting from a Zn—Fe metallic compound formed by heating at hot pressing.

ii) Scales and ZnO tend to be formed in a Zn-containing coating layer having a low melting point of less than 700° C.

iii) The formation of scales and ZnO can be effectively suppressed by forming a coating layer with a high melting point which contains 10 to 25 mass % of Ni and a balance of Zn and inevitable impurities.

iv) To obtain excellent cold pressing properties, it is effective to provide a lubricating layer containing a solid lubricant on a coating layer.

v) Hot pressed members which are manufactured using steel sheets coated with a Zn or Zn-based alloy coating layer according to JP '145 and JP '548 are poor in corrosion perforation resistance because heating performed before hot pressing causes the zinc in the coating layer to be diffused into the base steel sheet to be incorporated into an Fe—Zn solid solution phase, or causes the zinc to form a large amount of zinc oxide on the surface of the coating layer, thus resulting in a marked decrease in a sacrificial anticorrosive effect that is inherent to zinc.

vi) To effectively suppress the diffusion of zinc in a coating layer into a base steel sheet, it is effective to provide a coating layer on the surface of a steel sheet which contains not less than 60 mass % of Ni and a balance of Zn and inevitable impurities. Further, to suppress formation of a large amount of zinc oxide on the surface of a coating layer, it is also effective to provide a coating layer II which contains 10 to 25 mass % of Ni and a balance of Zn and inevitable impurities on the coating layer I.

vii) To obtain excellent cold pressing properties, it is effective to provide a lubricating layer containing a solid lubricant on the coating layer II.

We thus provide a hot-pressing steel sheet that includes a coating layer containing 10 to 25 mass % of Ni and a balance of Zn and inevitable impurities and having a mass per unit area of 10 to 90 g/m$^2$, and a lubricating layer containing a solid lubricant, in the order named on the surface of a steel sheet.

It is preferable that the hot-pressing steel sheet further include at least one compound layer selected from a Si-containing compound layer, a Ti-containing compound layer, an Al-containing compound layer and a Zr-containing compound layer between the coating layer and the lubricating layer.

We also provide a hot-pressing steel sheet that includes a coating layer containing 10 to 25 mass % of Ni and a balance of Zn and inevitable impurities and having a mass per unit area of 10 to 90 g/m$^2$, and at least one compound layer containing a solid lubricant and selected from a Si-containing compound layer, a Ti-containing compound layer, an Al-containing compound layer and a Zr-containing compound layer, in the order named on the surface of a steel sheet.

In any of the hot-pressing steel sheets, the base steel sheet which is a substrate for the coating layer may be a steel sheet having a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance. It is preferable that the base steel sheet further contain, in terms of mass %, at least one selected from Cr: 0.01 to 1%, Ti: not more than 0.2% and B: 0.0005 to 0.08%, and/or contain Sb: 0.003 to 0.03%.

We also provide a process of manufacturing a hot pressed member, including cold pressing any of the above hot-pressing steel sheets, thereafter heating the cold pressed steel to a temperature in the range of an Ac$_3$ transformation temperature to 1000° C., and hot pressing the steel.

We further provide a hot-pressing steel sheet that includes a coating layer I containing not less than 60 mass % of Ni and a balance of Zn and inevitable impurities and having a mass per unit area of 0.01 to 5 g/m$^2$, a coating layer II containing 10 to 25 mass % of Ni and a balance of Zn and inevitable impurities and having a mass per unit area of 10 to 90 g/m$^2$, and a lubricating layer containing a solid lubricant, in the order named on the surface of a steel sheet.

It is preferable that the above hot-pressing steel sheet further include at least one compound layer selected from a Si-containing compound layer, a Ti-containing compound layer, an Al-containing compound layer and a Zr-containing compound layer between the coating layer II and the lubricating layer.

We also provide a hot-pressing steel sheet that includes a coating layer I containing not less than 60 mass % of Ni and a balance of Zn and inevitable impurities and having a mass per unit area of 0.01 to 5 g/m$^2$, a coating layer II containing 10 to 25 mass % of Ni and a balance of Zn and inevitable impurities and having a mass per unit area of 10 to 90 g/m$^2$, and at least one compound layer containing a solid lubricant and selected from a Si-containing compound layer, a Ti-containing compound layer, an Al-containing compound layer and a Zr-containing compound layer, in the order named on the surface of a steel sheet.

In any of the hot-pressing steel sheets, the base steel sheet which is a substrate for the coating layers may be a steel sheet having a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance. It is preferable that the base steel sheet further contain, in terms of mass %, at least one selected from Cr: 0.01 to 1%, Ti: not more than 0.2% and B: 0.0005 to 0.08%, and/or contain Sb: 0.003 to 0.03%.

We provide a process of manufacturing a hot pressed member, including cold pressing any of the above hot-pressing steel sheets, thereafter heating the cold pressed steel to a temperature in the range of an Ac$_3$ transformation temperature to 1000° C., and hot pressing the steel.

In the above process of manufacturing a hot pressed member, it is preferable that the cold pressed steel is heated to a temperature in the range of an Ac$_3$ transformation temperature to 1000° C. at an average temperature increase rate of not less than 100° C./s.

We provide for the manufacturing of a hot-pressing steel sheet which is excellent in oxidation resistance to be capable of suppressing the formation of scales and ZnO during hot pressing as well as is excellent in cold pressing properties. Further, a hot-pressing steel sheet which is excellent in corrosion perforation resistance after being hot pressed as well as in cold pressing properties can be manufactured. Hot pressed members manufactured by our hot pressing processes using our hot-pressing steel sheets have a good appearance and are excellent in terms of the adhesion to a coating and the corrosion resistance, thus being suitably used as vehicle chassis members and body structure members.

REFERENCE SIGNS LIST

1 SAMPLE (STEEL SHEET)
2 SAMPLE TABLE
3 SLIDE TABLE
4 ROLLERS
5 SLIDE TABLE SUPPORT
6 BEAD
7 FIRST LOAD CELL
8 SECOND LOAD CELL
9 RAILS

DETAILED DESCRIPTION

Structure A
A-1 Hot-Pressing Steel Sheets
A-1-1) Coating Layer

In Structure A, a coating layer containing 10 to 25 mass % of Ni and a balance of Zn and inevitable impurities is provided on the surface of a steel sheet to suppress the formation of scales and ZnO during hot pressing. Regulating the Ni content in the coating layer to be 10 to 25 mass % results in the formation of a γ-phase which has as high a melting point as 881° C. and has a Ni$_2$Zn$_{11}$, NiZn$_3$ or Ni$_5$Zn$_{21}$ crystalline structure, thus minimally suppressing the reaction forming scales and ZnO from taking place during heating. Because a Zn—Fe metallic compound is not formed during heating, cracks are prevented from occurring and the consequent formation of scales is also suppressed. Even after the completion of hot pressing, the coating layer maintains the γ-phase to exhibit excellent corrosion resistance utilizing the sacrificial anticorrosive effect of zinc. The γ-phase formed by regulating the Ni content to be 10 to 25 mass % is not necessarily in agreement with an equilibrium diagram of Ni—Zn alloy. The reason for this is probably because the reaction for forming the coating layer, which is performed by a method such as electroplating, is a non-equilibrium reaction. The γ-phase of $Ni_2Zn_{11}$, $NiZn_3$ or $Ni_5Zn_{21}$ may be identified by X-ray diffractometry or electron diffractometry using TEM (Transmission Electron Microscopy). When the γ-phase is formed in the coating layer by regulating the Ni content to be 10 to 25 mass %, an amount of an η-phase may be mixed depending on, for example, electroplating conditions. To minimally suppress the reaction forming zinc oxide on the surface of the coating layer during heating, the amount of the η-phase is preferably not more than 5 mass %. The amount of the η-phase is defined by the weight ratio of the η-phase to the total weight of the coating layer, and may be determined by, for example, an anodic dissolution method.

In each surface of the steel sheet, the coating layer has a mass per unit area ranging from 10 to 90 $g/m^2$. If the mass per unit area is less than 10 $g/m^2$, the sacrificial anticorrosive effect of zinc cannot be fully obtained. A mass per unit area exceeding 90 $g/m^2$ no longer increases the effect and only results in a cost increase.

The coating layer may be formed by any method without limitation. A known electroplating method is suitable.

A-1-2) Lubricating Layer

A lubricating layer containing a solid lubricant is provided on the coating layer to obtain excellent cold pressing properties. Such a lubricating layer lowers the dynamic friction coefficient to improve cold pressing properties.

Examples of the solid lubricants include the following. At least one of these solid lubricants may be used.

(1) Polyolefin waxes and paraffin waxes: For example, polyethylene wax, synthetic paraffin, natural paraffin, micro wax and chlorinated hydrocarbon.
(2) Fluororesins: For example, polyfluoroethylene resin (e.g., polytetrafluoroethylene resin), polyvinyl fluoride resin and polyvinylidene fluoride resin.
(3) Fatty acid amide compounds: For example, stearamide, palmitamide, methyl-enebisstearamide, ethyl-enebisstearamide, oleamide, esylamide and alkylene bis-fatty acid amide.
(4) Metal soaps: For example, calcium stearate, lead stearate, calcium laurate and calcium palmitate.
(5) Metal sulfides: For example, molybdenum disulfide and tungsten disulfide.
(6) Others: For example, graphite, graphite fluoride, boron nitride, borax, polyalkylene glycol and alkali metal sulfate.

Of these solid lubricants, polyethylene waxes and fluororesins are particularly preferable. Examples of the polyethylene waxes include Ceridust 9615A, Ceridust 3715, Ceridust 3620 and Ceridust 3910 (trade names) manufactured by Clariant (Japan) K.K.; SANWAX 131-P and SANWAX 161-P (trade names) manufactured by Sanyo Chemical Industries, Ltd; and CHEMIPEARL W-100, CHEMIPEARL W-200, CHEMIPEARL W-500, CHEMIPEARL W-800 and CHEMIPEARL W-950 (trade names) manufactured by Mitsui Chemicals, Inc. The most preferable fluororesin is polytetrafluoroethylene resin. Preferred examples of such resins include LUBRON L-2 and LUBRON L-5 (trade names) manufactured by DAIKIN INDUSTRIES, Ltd.; MP1100 and MP1200 (trade names) manufactured by Mitsui-DuPont Co., Ltd.; and Fluon Dispersion AD1, Fluon Dispersion AD2, Fluon L141J, Fluon L150J and Fluon L170J (trade names) manufactured by ASAHI GLASS CO., LTD.

The lubricating layer containing a solid lubricant such as any of those described above may be formed by attaching a composition that contains the solid lubricant and an organic resin serving as a binder onto the coating layer and drying the wet film by heating without washing with water. The organic resin serving as a binder also ensures excellent coating adhesion. The composition may be attached by any treatment method such as an application method, a dipping method or a spray method, using a device such as a roll coater, a squeeze coater or a die coater. After the application, dipping or spray treatment with a squeeze coater or the like, an air knife method or a roll squeeze method may be performed to control the amount of the composition attached as well as to make the appearance and the thickness uniform.

The organic resin serving as a binder for the lubricating layer may be appropriately at least one selected from epoxy resins, modified epoxy resins, polyhydroxy polyether resins, polyalkylene-glycol-modified epoxy resins, urethane-modified epoxy resins, resins obtained by further modifying any of these resins, polyester resins, urethane resins, acrylic resins and polyolefin resins. These resins may be used in combination with a known curing agent such as a melamine resin or an isocyanate resin. Further, an organic resin may be used in which an OH group has been added to a terminal of the resin so that the lubricating layer can be dissolved and removed with an aqueous alkaline solution after cold pressing.

The amount of the solid lubricant in the lubricating layer is preferably 1 to 20 parts by mass (in terms of solid content), and more preferably 1 to 10 parts by mass (in terms of solid content) with respect to 100 parts by mass (in terms of solid content) of a composition containing the organic resin serving as a binder. High lubricating effects are obtained when the amount of the solid lubricant is 1 part by mass or more. Amounts which are not more than 20 parts by mass ensure that the adhesion to a coating is not lowered.

The dry thickness of the lubricating layer is preferably 0.1 to 2.0 μm. When the layer thickness is 0.1 μm or more, a sufficient effect can be achieved in the improvement of cold pressing properties. A thickness that is not more than 2.0 μm ensures that the amount of heat de-composition products generated from the organic resin component during hot pressing is small.

A-1-3) Compound Layers

Excellent adhesion to a coating may be obtained by providing at least one compound layer selected from a Si-containing compound layer, a Ti-containing compound layer, an Al-containing compound layer and a Zr-containing compound layer between the coating layer and the lubricating layer. The thickness of the compound layer is preferably not less than 0.1 μm to obtain such an effect. If the thickness of the compound layer exceeds 3.0 μm, the compound layer becomes brittle to possibly lower the adhesion to a coating. Thus, the thickness is preferably not more than 3.0 μm, and is more preferably from 0.4 to 2.0 μm.

Examples of Si-containing compounds include silicone resins, lithium silicate, silicate soda, colloidal silica and silane coupling agents. Examples of Ti-containing compounds include titanates such as lithium titanate and calcium titanate, and titanium coupling agents based on titanium alkoxides or chelated titanium compounds. Examples of Al-containing compounds include aluminates such as sodium aluminate and calcium aluminate, and aluminum coupling agents based on aluminum alkoxides or chelated aluminum compounds. Examples of Zr-containing compounds include zirconates such as lithium zirconate and calcium zirconate, and zirconium coupling agents based on zirconium alkoxides or chelated zirconium compounds.

The compound layer(s) may be formed on the coating layer by attaching at least one compound selected from the above Si-containing compounds, Ti-containing compounds, Al-containing compounds and Zr-containing compounds on the coating layer, and drying the wet film(s) by heating without washing with water. These compounds may be attached by any treatment method such as an application method, a dipping method or a spray method, using a device such as a roll coater, a squeeze coater or a die coater. After the application, dipping or spray treatment with a squeeze coater or the like, an air knife method or a roll squeeze method may be performed to control the amount of the compound attached as well as to make the appearance and the thickness uniform. The drying by heating is preferably carried out such that the maximum reached temperature of the steel sheet will be 40 to 200° C., and more preferably 60 to 160° C.

Alternatively, the compound layer(s) may be formed on the coating layer by a method in which the steel sheet having the coating layer is dipped into an acidic aqueous solution that contains at least one cation selected from Si, Ti, Al and Zr and at least one anion selected from phosphate ion, hexafluorosilicate ion, hexafluorotitanate ion, hexafluorozirconate ion and fluoride ion, and after this reaction treatment the steel sheet is dried by heating without being washed with water or after being washed with water.

Excellent cold pressing properties may be alternatively obtained by adding the solid lubricant into the compound layer instead of by providing the lubricating layer.

The amount of the solid lubricant added into the compound layer is preferably 1 to 20 parts by mass (in terms of solid content), and more preferably 1 to 10 parts by mass (in terms of solid content) with respect to 100 parts by mass (in terms of solid content) of the compound. Excellent lubricating effects are obtained when the amount of the solid lubricant is 1 part by mass or more. Amounts which are not more than 20 parts by mass ensure that the adhesion to a coating is not lowered.

A-1-4) Base Steel Sheet

To obtain a hot pressed member having a strength of not less than 980 MPa, the base steel sheet which is a substrate for the coating layer may be, for example, a hot rolled steel sheet or a cold rolled steel sheet having a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance. Hereinbelow, there will be described the reasons why the component elements are limited to the above elements. The percentages [%] indicating the contents of the components refer to "mass %" unless otherwise mentioned.

C: 0.15 to 0.5%

Carbon is an element that improves the strength of steel. For a hot pressed member to exhibit TS of not less than 980 MPa, the carbon content needs to be not less than 0.15%. If the carbon content is in excess of 0.5%, the material steel sheet is markedly deteriorated in blanking formability. Thus, the carbon content is limited to 0.15 to 0.5%.

Si: 0.05 to 2.0%

Similarly to carbon, silicon is an element that increases the strength of steel. For a hot pressed member to exhibit TS of not less than 980 MPa, the silicon content needs to be not less than 0.05%. Any silicon content in excess of 2.0% results in a marked increase in the generation of surface defects called red scales during hot rolling, as well as an increase in rolling load and a deterioration in terms of ductility of hot rolled steel sheets. Further, a silicon content exceeding 2.0% can often cause adverse effects on plating processability when a Zn-based coating layer is deposited on the surface of the steel sheet. Thus, the silicon content is limited to 0.05 to 2.0%.

Mn: 0.5 to 3%

Manganese is an effective element to suppress ferrite transformation and improve hardenability. Further, manganese can lower the $Ac_3$ transformation temperature and is therefore effective in decreasing the temperature of heating before hot pressing. The manganese content needs to be not less than 0.5% for these effects to be exhibited. If the manganese content is in excess of 3%, the element is segregated to deteriorate the uniformity of the properties of the material steel sheet and those of a hot pressed member. Thus, the manganese content is limited to 0.5 to 3%.

P: not more than 0.1%

If the phosphorus content is in excess of 0.1%, the element is segregated to deteriorate the uniformity of the properties of the material steel sheet and those of a hot pressed member, as well as to cause a marked decrease in toughness. Thus, the phosphorus content is limited to be not more than 0.1%.

S: not more than 0.05%

Any sulfur content exceeding 0.05% causes a decrease in the toughness of a hot pressed member. Thus, the sulfur content is limited to be not more than 0.05%.

Al: not more than 0.1%

If the aluminum content is in excess of 0.1%, the blanking formability and the hardenability of the material steel sheet are decreased. Thus, the aluminum content is limited to be not more than 0.1%.

N: not more than 0.01%

If the nitrogen content is in excess of 0.01%, a nitride, AlN, is formed during hot rolling or heating prior to hot pressing, resulting in decreases in the blanking formability and the hardenability of the material steel sheet. Thus, the nitrogen content is limited to be not more than 0.01%.

The balance is represented by Fe and inevitable impurities. For the reasons described below, however, it is preferable that the steel sheet contain at least one selected from Cr: 0.01 to 1%, Ti: not more than 0.2% and B: 0.0005 to 0.08%, and/or contain Sb: 0.003 to 0.03%.

Cr: 0.01 to 1%

Chromium is an effective element to strengthen steel as well as improve hardenability. The chromium content is preferably 0.01% or more for these effects to be exhibited. On the other hand, adding chromium in an amount exceeding 1% causes a marked cost increase. Therefore, the upper limit is preferably 1%.

Ti: not more than 0.2%

Titanium is an effective element to strengthen steel as well as improve toughness by a grain refinement effect. Further, titanium can form a nitride in preference to boron described next to allow boron to form a solid solution, thus resulting in an improvement in hardenability. If the titanium content is in excess of 0.2%, an extremely high rolling load is incurred during hot rolling, and the toughness of a hot pressed member is lowered. Thus, the upper limit is preferably 0.2%.

B: 0.0005 to 0.08%

Boron is an effective element to improve hardenability during hot pressing and toughness after hot pressing. The boron content is preferably not less than 0.0005% for these effects to be exhibited. If the boron content exceeds 0.08%, the steel sheet incurs an extremely high rolling load during hot rolling and a martensite phase or a bainite phase will be formed after hot rolling, resulting in the occurrence of cracks in the steel sheet. Thus, the upper limit is preferably 0.08%.

Sb: 0.003 to 0.03%

Antimony has an effect of preventing a surface layer portion of the steel sheet from being decarburized during a series of treatments from when the steel sheet is heated prior to hot pressing until when the hot pressed steel is cooled. The antimony content needs to be 0.003% or more for this effect to be exhibited. Any antimony content in excess of 0.03% results in an increase in rolling load and a decrease in productivity. Thus, the antimony content is preferably 0.003 to 0.03%.

A-2 Process of Manufacturing Hot Pressed Member

Our hot-pressing steel sheets described above are cold pressed, heated to a temperature in the range of an $Ac_3$ transformation temperature to 1000° C., and thereafter hot pressed into a hot pressed member. The reason why the steel sheet is heated to an $Ac_3$ transformation temperature or above before hot pressing is that such a heated steel sheet is rapidly cooled during hot pressing with the result that a hard phase such as a martensite phase is formed, thereby increasing the strength of the member. The upper limit of the heating temperature is 1000° C. because if the temperature exceeds 1000° C., a large amount of ZnO is formed on the surface of the coating layer. As used herein, the heating temperature indicates the maximum reached temperature of the steel sheet.

During the heating which is performed before hot pressing, the average temperature increase rate is not particularly limited but is preferably, for example, 2 to 200° C./s. A higher average temperature increase rate is more preferable because the formation of ZnO on the surface of the coating layer and the local formation of scales in defective portions on the coating layer are increased as the steel sheet is exposed to high temperature conditions for a longer holding time at such a high temperature. Further, the holding time at the maximum reached sheet temperature is not particularly limited. For the same reason as that described above, however, a shorter holding time is more favorable, and the holding time is preferably not more than 300 s, more preferably not more than 120 s, and still more preferably not more than 10 s.

Examples of heating methods performed before hot pressing include heating with an electric furnace or a gas furnace, flame heating, electric heating, high frequency heating and induction heating.

EXAMPLE A

A cold rolled steel sheet was used as a base steel sheet which had a component composition represented by, in terms of mass %, C: 0.23%, Si: 0.25%, Mn: 1.2%, P: 0.01%, S: 0.01%, Al: 0.03%, N: 0.005%, Cr: 0.2%, Ti: 0.02%, B: 0.0022%, Sb: 0.008% and balance: Fe and inevitable impurities, and which had an $Ac_3$ transformation temperature of 820° C. and a sheet thickness of 1.6 mm. The surface of the cold rolled steel sheet was electroplated in a plating bath which contained 200 g/L of nickel sulfate hexahydrate and 10 to 100 g/L of zinc sulfate heptahydrate, at a pH of 1.5 and a temperature of 50° C. while changing the current density in the range of 5 to 100 A/dm$^2$. Thus, coating layers were formed which had a Ni content (the balance was Zn and inevitable impurities), a mass per unit area and a content of an η-phase described in Tables 1 and 2. Except for some steel sheets, a composition (solid content ratio: 15%) which contained a solid lubricant and either a compound or an organic binder described in Table 1 or 2, as well as a balance of a solvent was applied onto the coating layer and was dried under conditions such that the temperature of the steel sheet reached 140° C., and thereby a compound layer or a lubricating layer having a thickness described in Table 1 or 2 was formed. Thus, steel sheets Nos. 1 to 22 were prepared. When the compound used was a silicone resin and when the organic binder used was a diethanol-modified epoxy resin, the solvent used was a thinner consisting of ethylene glycol monobutyl ether:petroleum naphtha=55:45 (mass ratio). When the compound used was a silane coupling agent and when the organic binder used was ethylene ionomer, the solvent used was deionized water. The steel sheets Nos. 1 to 11 and 16 to 22 represented examples in which a compound layer containing a solid lubricant was provided. The steel sheets Nos. 12 and 13 represented examples in which a lubricating layer was provided. The steel sheet No. 14 represented an example in which a lubricating layer was provided on a compound layer. The steel sheet No. 15 represented an example in which no compound layer or no lubricating layer was provided.

The following solid lubricants, organic resin binders and compounds were used for the formation of the lubricating layers and the compound layers:

Silicone resin: KR-242A manufactured by Shin-Etsu Chemical Co., Ltd.

Polyethylene wax 1: Ceridust 3620 manufactured by Clariant (Japan) K.K.

Fluororesin: polytetrafluoroethylene resin Fluon L170J manufactured by ASAHI GLASS CO., LTD.

Molybdenum disulfide: LM-13 manufactured by DAITOU CO., LTD.

Graphite: GP-60S manufactured by Hitachi Chemical Co., Ltd.

Boron nitride: FS-1 manufactured by MIZUSHIMA FERROALLOY CO., LTD.

Diethanol-modified epoxy resin: ER-007 manufactured by Kansai Paint Co., Ltd.

Blocked isocyanate: DURANATE MF-K60X manufactured by Asahi Kasei Corporation

Ethylene ionomer: CHEMIPEARL 5650 manufactured by Mitsui Chemicals, Inc.

Polyethylene wax 2: CHEMIPEARL W950 manufactured by Mitsui Chemicals, Inc.

Silane coupling agent: KBE-403 manufactured by Shin-Etsu Chemical Co., Ltd.

The steel sheets Nos. 1 to 2 described in Tables 1 and 2 were tested by the following methods to evaluate cold pressing properties, oxidation resistance during hot pressing, and adhesion to a coating after hot pressing. Hot pressing was simulated by heating the steel sheet with an electric furnace or by directly passing a current under heating conditions described in Table 1 or 2, and thereafter sandwiching the steel sheet between Al-made mold sections to cool the steel sheet at a cooling rate of 50° C./s.

Cold pressing properties: Cold pressing properties were evaluated by measuring the dynamic friction coefficient with a friction coefficient measuring apparatus schematically illustrated in FIG. 1. First, a sample 1 obtained from the manufactured steel sheet was placed on a sample table 2 fixed on the upper surface of a slide table 3. The slide table 3 was horizontally movable by rollers 4 provided on the upper surface of a slide table support 5 that was located under the slide table. Next, the slide table support 5, which was vertically movable, was elevated to press the sample 1 against the lower surface of a bead 6 which was located above the sample and had a shape shown in FIG. 2. The pressure load N applied to the sample 1 was measured by a first load cell 7 fitted to the slide table support 5. Lastly, the slide table 3 was horizontally moved on rails 9 at a travel velocity of 100 cm/min while a predetermined pressure load N (=400 kgf) was applied to the sample, and the sliding frictional force F was measured with a second load cell 8 which was fitted to one end of the slide table 3. The dynamic friction coefficient $\mu=F/N$ at room temperature (25° C.) was determined. Prior to the testing, the surface of the sample 1 was coated with a lubricant oil which was press washing oil PRETON R352L manufactured by Sugimura Chemical Industrial Co., Ltd. The calculated $\mu$ value was evaluated on the basis of the following criteria. The symbols ⊙ and ◯ indicate that cold pressing properties were excellent.

Figure 1:
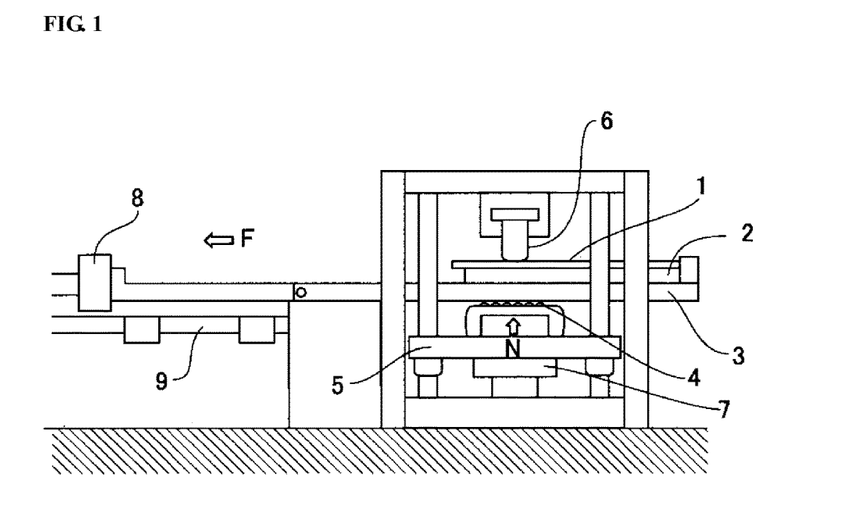
FIG. 1 is a view illustrating a friction coefficient measuring apparatus used in the EXAMPLES.
Figure 2:
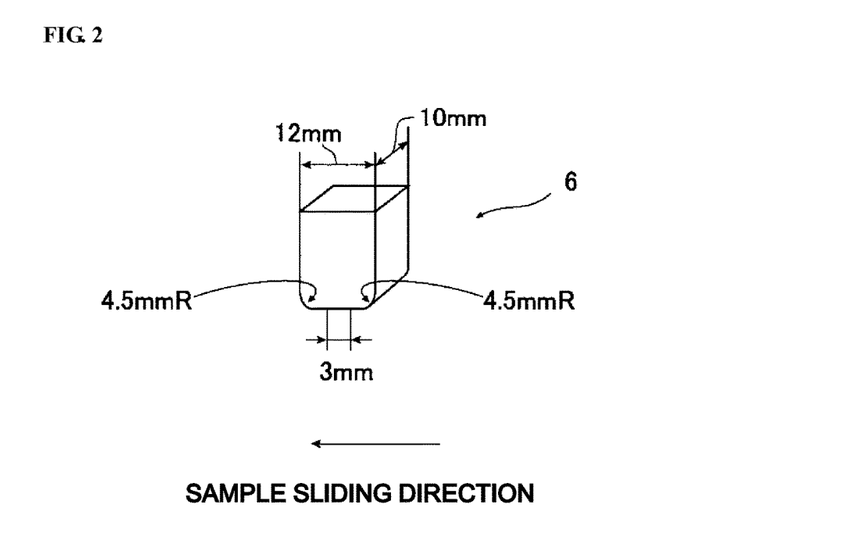
FIG. 2 is a view illustrating a shape of a bead 6 in FIG. 1.

⊙: $\mu<0.1$
◯: $0.1\leq\mu<0.15$
Δ: $0.15\leq\mu<0.2$
×: $0.2\leq\mu$

Oxidation resistance: The steel sheet was heated under heating conditions described in Table 1 or 2, and the weight of the steel sheet was measured. The change in weight between before and after the heating was determined. The change in weight was the sum of the weight increase due to the formation of scales and ZnO, and the weight loss due to the scattering of the formed ZnO. The oxidation resistance was evaluated to be higher as the absolute value of the weight change was smaller. The evaluation criteria are described below. The symbols ⊙ and ◯ indicate that oxidation resistance was satisfied.

⊙: Absolute value of weight change≤3 g/m$^2$
◯: 3 g/m$^2$<Absolute value of weight change≤5 g/m$^2$
×: 5 g/m$^2$<Absolute value of weight change Adhesion to coating: A sample was obtained from the heat-treated steel sheet and was subjected to a chemical conversion treatment under standard conditions using PB-SX35 manufactured by Nihon Parkerizing Co., Ltd. Thereafter, electrodeposition paint GT-10HT Gray manufactured by Kansai Paint Co., Ltd. was deposited and baked at 170° C. for 20 minutes to form a film with a thickness of 20 μm, thereby producing a painted test piece. The surface of the test piece which had been subjected to the chemical conversion treatment and the electrodeposition treatment was cut with a cutter knife to a depth reaching the base steel to form a lattice pattern (10×10 squares with 1 mm intervals). An adhesive tape was applied to and peeled from the lattice pattern. The result of this cross-cut adhesion test was evaluated on the basis of the following criteria. The symbols ⊙ and ◯ indicate that the adhesion to a coating was excellent.

⊙: No squares were separated.
◯: 1 to 10 squares were separated.
Δ: 11 to 30 squares were separated.
×: 31 or more squares were separated.

The results are described in Table 3. The results show that our steel sheets were excellent in terms of cold pressing properties and oxidation resistance during hot pressing, as well as in terms of the adhesion to a coating after being hot pressed.

In this EXAMPLE, cold pressing or hot pressing was not actually carried out. However, as described hereinabove, the oxidation resistance and the adhesion to a coating are susceptible to changes in the coating layer caused by heating before hot pressing, in particular the behavior of Zn in the coating layer. Accordingly, the results in this EXAMPLE qualify to be used for the evaluation of the oxidation resistance and the adhesion to a coating.

TABLE 1

| Steel Sheet No. | Coating layer | | | Compound layer | | | | Lubricating layer |
| | Ni content (mass %) | Mass per unit area (g/m$^2$) | η-phase content (mass %) | Compound | Solid lubricant | Solid lubricant content (mass %) | Thickness (μm) | Organic binder |
|---|---|---|---|---|---|---|---|---|
| 1 | 12 | 45 | 0 | Silicone resin | Polyethylene wax 1 | 5 | 0.5 | — |
| 2 | 12 | 45 | 0 | Silicone resin | Fluororesin | 5 | 0.5 | — |
| 3 | 12 | 45 | 0 | Silicone resin | Molybdenum disulfide | 5 | 0.5 | — |
| 4 | 12 | 45 | 0 | Silicone resin | Graphite | 5 | 0.5 | — |
| 5 | 12 | 45 | 0 | Silicone resin | Boron nitride | 5 | 0.5 | — |
| 6 | 12 | 45 | 0 | Silicone resin | Polyethylene wax 1 | 0.1 | 0.5 | — |
| 7 | 12 | 45 | 0 | Silicone resin | Polyethylene wax 1 | 1 | 0.5 | — |
| 8 | 12 | 45 | 0 | Silicone resin | Polyethylene wax 1 | 10 | 0.5 | — |
| 9 | 12 | 45 | 0 | Silicone resin | Polyethylene wax 1 | 20 | 0.5 | — |
| 10 | 12 | 45 | 0 | Silicone resin | Polyethylene wax 1 | 5 | 0.1 | — |
| 11 | 12 | 45 | 0 | Silicone resin | Polyethylene wax 1 | 5 | 2 | — |

TABLE 1-continued

| | Lubricating layer | | | Heating conditions | | | |
|---|---|---|---|---|---|---|---|
| Steel Sheet No. | Solid lubricant | Solid lubricant content (mass %) | Thickness (μm) | Average temperature increase rate (° C./s) | Heating temperature (° C.) | Holding time (s) | Remarks |
| 1 | — | — | — | 20 | 900 | 0 | Ex. |
| 2 | — | — | — | 20 | 900 | 0 | Ex. |
| 3 | — | — | — | 20 | 900 | 0 | Ex. |
| 4 | — | — | — | 20 | 900 | 0 | Ex. |
| 5 | — | — | — | 20 | 900 | 0 | Ex. |
| 6 | — | — | — | 20 | 900 | 0 | Ex. |
| 7 | — | — | — | 20 | 900 | 0 | Ex. |
| 8 | — | — | — | 20 | 900 | 0 | Ex. |
| 9 | — | — | — | 20 | 900 | 0 | Ex. |
| 10 | — | — | — | 20 | 900 | 0 | Ex. |
| 11 | — | — | — | 20 | 900 | 0 | Ex. |

TABLE 2

| | Coating layer | | | Compound layer | | | | |
|---|---|---|---|---|---|---|---|---|
| Steel sheet No. | Ni content (mass %) | Mass per unit area (g/m$^2$) | η-phase content (mass %) | Compound | Solid lubricant | Solid lubricant content (mass %) | Thickness (μm) | Lubricating layer Organic Binder |
| 12 | 12 | 45 | 0 | — | — | — | — | Diethanol-modified epoxy resin + blocked isocyanate |
| 13 | 12 | 45 | 0 | — | — | — | — | Ethylene ionomer |
| 14 | 12 | 45 | 0 | Silane coupling agent | — | — | 0.5 | Ethylene ionomer |
| 15 | 12 | 45 | 0 | — | — | — | — | — |
| 16 | 10 | 45 | 0 | Silicone resin | Polyethylene wax 1 | 5 | 0.5 | — |
| 17 | 18 | 45 | 0 | Silicone resin | Polyethylene wax 1 | 5 | 0.5 | — |
| 18 | 25 | 45 | 0 | Silicone resin | Polyethylene wax 1 | 5 | 0.5 | — |
| 19 | 12 | 10 | 0 | Silicone resin | Polyethylene wax 1 | 5 | 0.5 | — |
| 20 | 12 | 30 | 0 | Silicone resin | Polyethylene wax 1 | 5 | 0.5 | — |
| 21 | 12 | 60 | 0 | Silicone resin | Polyethylene wax 1 | 5 | 0.5 | — |
| 22 | 12 | 90 | 0 | Silicone resin | Polyethylene wax 1 | 5 | 0.5 | — |

| | Lubricating layer | | | Heating conditions | | | |
|---|---|---|---|---|---|---|---|
| Steel sheet No. | Solid lubricant | Solid lubricant content (mass %) | Thickness (μm) | Average temperature increase rate (° C./s) | Heating temperature (° C.) | Holding time (s) | Remarks |
| 12 | Polyethylene wax 1 | 5 | 0.5 | 20 | 900 | 0 | Ex. |
| 13 | Polyethylene wax 2 | 5 | 0.5 | 20 | 900 | 0 | Ex. |
| 14 | Polyethylene wax 2 | 5 | 0.5 | 20 | 900 | 0 | Ex. |
| 15 | — | — | — | 20 | 900 | 0 | Comp. Ex. |
| 16 | — | — | — | 20 | 900 | 0 | Ex. |
| 17 | — | — | — | 20 | 900 | 0 | Ex. |
| 18 | — | — | — | 20 | 900 | 0 | Ex. |
| 19 | — | — | — | 20 | 900 | 0 | Ex. |
| 20 | — | — | — | 20 | 900 | 0 | Ex. |
| 21 | — | — | — | 20 | 900 | 0 | Ex. |
| 22 | — | — | — | 20 | 900 | 0 | Ex. |

TABLE 3

| Steel sheet No. | Cold pressing properties | Oxidation resistance Weight change (g/m²) | Evaluation | Adhesion with coating | Remarks |
|---|---|---|---|---|---|
| 1 | ◎ | +0.5 | ◎ | ◎ | Ex. |
| 2 | ◎ | +0.5 | ◎ | ◎ | Ex. |
| 3 | ○ | +0.4 | ◎ | ○ | Ex. |
| 4 | ○ | +0.6 | ◎ | ○ | Ex. |
| 5 | ○ | +0.5 | ◎ | ○ | Ex. |
| 6 | ○ | +0.5 | ◎ | ◎ | Ex. |
| 7 | ○ | +0.5 | ◎ | ○ | Ex. |
| 8 | ◎ | +0.5 | ◎ | ◎ | Ex. |
| 9 | ◎ | +0.6 | ◎ | ○ | Ex. |
| 10 | ○ | +0.6 | ◎ | ◎ | Ex. |
| 11 | ◎ | +0.4 | ◎ | ○ | Ex. |
| 12 | ◎ | +0.6 | ◎ | ○ | Ex. |
| 13 | ◎ | +0.6 | ◎ | ○ | Ex. |
| 14 | ◎ | +0.6 | ◎ | ○ | Ex. |
| 15 | △ | +0.4 | ◎ | △ | Comp. Ex. |
| 16 | ◎ | +0.6 | ◎ | ○ | Ex. |
| 17 | ◎ | +0.4 | ◎ | ◎ | Ex. |
| 18 | ◎ | +0.3 | ◎ | ◎ | Ex. |
| 19 | ◎ | +0.8 | ◎ | ○ | Ex. |
| 20 | ◎ | +0.6 | ◎ | ◎ | Ex. |
| 21 | ◎ | +0.3 | ◎ | ◎ | Ex. |
| 22 | ◎ | +0.2 | ◎ | ◎ | Ex. |

Structure B
B-1 Hot-Pressing Steel Sheets
B-1-1) Coating Layers

In Structure B, a coating layer I which contains not less than 60 mass % of Ni and a balance of Zn and inevitable impurities is provided on the surface of a steel sheet to suppress the Zn in the coating layer from being diffused into the base steel sheet, thereby achieving excellent corrosion perforation resistance. If the Ni content in the coating layer I is less than 60 mass %, the Zn in the coating layer cannot be sufficiently suppressed from being diffused into the base steel sheet, thus failing to achieve excellent corrosion perforation resistance. The Ni content in the coating layer I is preferably 100 mass %. When the content is less than 100 mass %, however, the balance is represented by Zn having a sacrificial anticorrosive effect and inevitable impurities. In each surface of the coating layer I, the mass per unit area is 0.01 to 5 g/m². If the mass per unit area is less than 0.01 g/m², a sufficient effect cannot be obtained in suppressing the diffusion of Zn into the base steel sheet. A mass per unit area exceeding 5 g/m² no longer increases the effect and only results in a cost increase.

In Structure B, a coating layer II is provided on the coating layer I to suppress the formation of a large amount of zinc oxide on the surface of the coating layer, thereby achieving excellent corrosion perforation resistance. The coating layer II contains 10 to 25 mass % of Ni and a balance of Zn and inevitable impurities. Regulating the Ni content in the coating layer II to be 10 to 25 mass % results in the formation of a γ-phase which has as high a melting point as 881° C. and has a crystalline structure of $Ni_2Zn_{11}$, $NiZn_3$ or $Ni_5Zn_{21}$, thus minimally suppressing the reaction forming zinc oxide from taking place on the surface of the coating layer during heating. Even after the completion of hot pressing, the coating layer II maintains the γ-phase to exhibit excellent corrosion perforation resistance utilizing the sacrificial anticorrosive effect of zinc. The γ-phase formed by regulating the Ni content to be 10 to 25 mass % is not necessarily in agreement with an equilibrium diagram of Ni—Zn alloy. The reason for this disagreement is probably because the reaction for forming the coating layer, which is performed by a method such as electroplating, is a non-equilibrium reaction. The γ-phase of $Ni_2Zn_{11}$, $NiZn_3$ or $Ni_5Zn_{21}$ may be identified by X-ray diffractometry or electron diffractometry using TEM (Transmission Electron Microscopy). When the γ-phase is formed in the coating layer II by regulating the Ni content to be 10 to 25 mass %, an amount of an η-phase may be mixed depending on, for example, electroplating conditions. To minimally suppress the reaction forming zinc oxide on the surface of the coating layer during heating, the amount of the η-phase is preferably not more than 5 mass %. The amount of the η-phase is defined by the weight ratio of the η-phase to the total weight of the coating layer II, and may be determined by, for example, an anodic dissolution method.

In each surface of the coating layer II, the mass per unit area is 10 to 90 g/m². The sacrificial anticorrosive effect of zinc cannot be fully obtained if the mass per unit area is less than 10 g/m². A mass per unit area exceeding 90 g/m² no longer increases the effect and only results in a cost increase.

The coating layers I and II may be formed by any method without limitation. A known electroplating method is suitable.

B-1-2) Lubricating Layer

In this case, a lubricating layer containing a solid lubricant is provided on the coating layer II to obtain excellent cold pressing properties. Such a lubricating layer lowers dynamic friction coefficient to improve cold pressing properties.

Examples of the solid lubricants include the following. At least one of these solid lubricants may be used.

(1) Polyolefin waxes and paraffin waxes: For example, polyethylene wax, synthetic paraffin, natural paraffin, micro wax and chlorinated hydrocarbon.
(2) Fluororesins: For example, polyfluoroethylene resin (e.g., polytetrafluoroethylene resin), polyvinyl fluoride resin and polyvinylidene fluoride resin.
(3) Fatty acid amide compounds: For example, stearamide, palmitamide, methylenebisstearamide, ethylenebisstearamide, oleamide, erucylamide and alkylene bis-fatty acid amide.
(4) Metal soaps: For example, calcium stearate, lead stearate, calcium laurate and calcium palmitate.
(5) Metal sulfides: For example, molybdenum disulfide and tungsten disulfide.
(6) Others: For example, graphite, graphite fluoride, boron nitride, borax, polyalkylene glycol and alkali metal sulfate.

Of these solid lubricants, polyethylene waxes and fluororesins are particularly preferable. Examples of the polyethylene waxes include Ceridust 9615A, Ceridust 3715, Ceridust 3620 and Ceridust 3910 (trade names) manufactured by Clariant (Japan) K.K.; SANWAX 131-P and SANWAX 161-P (trade names) manufactured by Sanyo Chemical Industries, Ltd; and CHEMIPEARL W-100, CHEMIPEARL W-200, CHEMIPEARL W-500, CHEMIPEARL W-800 and CHEMIPEARL W-950 (trade names) manufactured by Mitsui Chemicals, Inc. The most preferable fluororesin is polytetrafluoroethylene resin. Preferred examples of such resins include LUBRON L-2 and LUBRON L-5 (trade names) manufactured by DAIKIN INDUSTRIES, Ltd.; MP1100 and MP1200 (trade names) manufactured by Mitsui-DuPont Co., Ltd.; and Fluon Dispersion AD1, Fluon Dispersion AD2, Fluon L141J, Fluon L150J and Fluon L170J (trade names) manufactured by ASAHI GLASS CO., LTD.

The lubricating layer containing a solid lubricant such as any of those described above may be formed by attaching a composition that contains the solid lubricant and an organic resin serving as a binder onto the coating layer II and drying the wet film by heating without washing with water. The organic resin serving as a binder also ensures excellent adhesion to a coating. The composition may be attached by any treatment method such as an application method, a dipping method or a spray method, using a device such as a roll coater, a squeeze coater or a die coater. After the application, dipping or spray treatment with a squeeze coater or the like, an air knife method or a roll squeeze method may be performed to control the amount of the composition attached as well as to make the appearance and the thickness uniform.

The organic resin serving as a binder for the lubricating layer may be appropriately at least one selected from epoxy resins, modified epoxy resins, polyhydroxy polyether resins, polyalkylene-glycol-modified epoxy resins, urethane-modified epoxy resins, resins obtained by further modifying any of these resins, polyester resins, urethane resins, acrylic resins and polyolefin resins. These resins may be used in combination with a known curing agent such as a melamine resin or an isocyanate resin. Further, an organic resin may be used in which an OH group has been added to a terminal of the resin so that the lubricating layer can be dissolved and removed with an aqueous alkaline solution after cold pressing.

The amount of the solid lubricant in the lubricating layer is preferably 1 to 20 parts by mass (in terms of solid content), and more preferably 1 to 10 parts by mass (in terms of solid content) with respect to 100 parts by mass (in terms of solid content) of a composition containing the organic resin serving as a binder. High lubricating effects are obtained when the amount of the solid lubricant is 1 part by mass or more. Amounts which are not more than 20 parts by mass ensure that the adhesion to a coating is not lowered.

The dry thickness of the lubricating layer is preferably 0.1 to 2.0 μm. When the layer thickness is 0.1 μm or more, a sufficient effect can be achieved in the improvement of cold pressing properties. A thickness that is not more than 2.0 μm ensures that the amount of heat decomposition products generated from the organic resin component during hot pressing is small.

B-1-3) Compound Layers

Excellent adhesion to a coating may be obtained by providing at least one compound layer selected from a Si-containing compound layer, a Ti-containing compound layer, an Al-containing compound layer and a Zr-containing compound layer between the coating layer II and the lubricating layer. To obtain such an effect, the thickness of the compound layer is preferably not less than 0.1 μm. The thickness of the compound layer is preferably not more than 3.0 μm because the compound layer with a thickness of 3.0 μm or less does not become brittle and does not lower the adhesion to a coating. More preferably, the thickness is 0.4 to 2.0 μm.

Examples of Si-containing compounds include silicone resins, lithium silicate, silicate soda, colloidal silica and silane coupling agents. Examples of Ti-containing compounds include titanium coupling agents based on titanates such as lithium titanate and calcium titanate, titanium alkoxides or chelated titanium compounds. Examples of Al-containing compounds include aluminum coupling agents based on aluminates such as sodium aluminate and calcium aluminate, aluminum alkoxides or chelated aluminum compounds. Examples of Zr-containing compounds include zirconium coupling agents based on zirconates such as lithium zirconate and calcium zirconate, zirconium alkoxides or chelated zirconium compounds.

The compound layer(s) may be formed on the coating layer II by attaching at least one compound selected from the above Si-containing compounds, Ti-containing compounds, Al-containing compounds and Zr-containing compounds on the coating layer II, and drying the wet film(s) by heating without washing with water. These compounds may be attached by any treatment method such as an application method, a dipping method or a spray method, using a device such as a roll coater, a squeeze coater or a die coater. After the application, dipping or spray treatment with a squeeze coater or the like, an air knife method or a roll squeeze method may be performed to control the amount of the compound attached as well as to make the appearance and the thickness uniform. The drying by heating is preferably carried out such that the maximum reached temperature of the steel sheet will be 40 to 200° C., and more preferably 60 to 160° C.

Alternatively, the compound layer(s) may be formed on the coating layer II by a method in which the steel sheet having the coating layers I and II is dipped into an acidic aqueous solution that contains at least one cation selected from Si, Ti, Al and Zr and at least one anion selected from phosphate ion, hydrogen fluoride ion and fluoride ion, and after this reaction treatment the steel sheet is dried by heating without being washed with water or after being washed with water.

Excellent cold pressing properties may be alternatively obtained by adding the solid lubricant into the compound layer instead of by providing the lubricating layer.

The amount of the solid lubricant added into the compound layer is preferably 1 to 20 parts by mass (in terms of solid content), and more preferably 1 to 10 parts by mass (in terms of solid content) with respect to 100 parts by mass (in terms of solid content) of the compound. Excellent lubricating effects are obtained when the amount of the solid lubricant is 1 part by mass or more. Amounts which are not more than 20 parts by mass ensure that the adhesion to a coating is not lowered.

B-1-4) Base Steel Sheet

To obtain a hot pressed member having a strength of not less than 980 MPa, the base steel sheet which is a substrate for the coating layers may be, for example, a hot rolled steel sheet or a cold rolled steel sheet having a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance. The reasons why the component elements of the base steel sheet are limited to the above elements are the same as those reasons described in Structure A. Thus, the description of the reasons is omitted.

B-2 Process of Manufacturing Hot Pressed Member

Our hot-pressing steel sheets described above are cold pressed, heated to a temperature in the range of an $Ac_3$ transformation temperature to 1000° C., and thereafter hot pressed into a hot pressed member. The reason why the steel sheet is heated to an $Ac_3$ transformation temperature or above before hot pressing is that such a heated steel sheet is rapidly cooled during hot pressing with the result that a hard phase such as a martensite phase is formed, thereby increasing the strength of the member. The upper limit of the heating temperature is 1000° C. because if the temperature exceeds 1000° C., a large amount of zinc oxide is formed on the surface of the coating layer, thus resulting in poor corrosion perforation resistance. As used herein, the heating temperature indicates the maximum reached temperature of the steel sheet.

By regulating the average temperature increase rate during the heating which is performed before hot pressing to be not less than 100° C./s, the formation of zinc oxide on the surface of the coating layer can be suppressed more reliably, thereby achieving higher corrosion perforation resistance. Zinc oxide is formed on the surface of the coating layer in a larger amount as the steel sheet is exposed to high temperature conditions for a longer holding time at such a high temperature. The higher the average temperature increase rate, the shorter the holding time at a high temperature, thereby the formation of zinc oxide on the surface of the coating layer is suppressed. The holding time at the maximum reached sheet temperature is not particularly limited. To suppress the formation of zinc oxide, however, a shorter holding time is more favorable, and the holding time is preferably not more than 300 s, more preferably not more than 60 s, and still more preferably not more than 10 s.

Examples of heating methods performed before hot pressing include heating with an electric furnace or a gas furnace, flame heating, electric heating, high frequency heating and induction heating. In particular, electric heating, high frequency heating, induction heating or the like is suitable to achieve an average temperature increase rate of not less than 100° C./s.

EXAMPLE B

A cold rolled steel sheet was used as a base steel sheet which had a component composition represented by, in terms of mass %, C: 0.23%, Si: 0.25%, Mn: 1.2%, P: 0.01%, S: 0.01%, Al: 0.03%, N: 0.005%, Cr: 0.2%, Ti: 0.02%, B: 0.0022%, Sb: 0.008% and balance: Fe and inevitable impurities, and which had an $Ac_3$ transformation temperature of 820° C. and a sheet thickness of 1.6 mm. The surface of the cold rolled steel sheet was electroplated in a plating bath which contained 200 g/L of nickel sulfate hexahydrate and 0 to 50 g/L of zinc sulfate heptahydrate, at a pH of 3.0 and a temperature of 50° C. while changing the current density in the range of 5 to 100 A/dm². Thus, coating layers I were formed which had a Ni content and a mass per unit area described in Tables 4 and 5. Subsequently, electrodeposition was carried out in a plating bath which contained 200 g/L of nickel sulfate hexahydrate and 10 to 100 g/L of zinc sulfate heptahydrate, at a pH of 1.5 and a temperature of 50° C. while changing the current density in the range of 5 to 100 A/dm². Thus, coating layers II were formed which had a Ni content, a mass per unit area and a content of an η-phase described in Tables 4 and 5. Except for some steel sheets, a composition (solid content ratio: 15%) which contained a solid lubricant and either a compound or an organic binder described in Table 4 or 5, as well as a balance of a solvent was applied onto the coating layer II and was dried under conditions such that the temperature of the steel sheet reached 140° C., and thereby a compound layer or a lubricating layer having a thickness described in Table 4 or 5 was formed. Thus, steel sheets Nos. 1 to 25 were prepared. When the compound used was a silicone resin and when the organic binder used was a diethanol-modified epoxy resin, the solvent used was a thinner consisting of ethylene glycol monobutyl ether:petroleum naphtha=55:45 (mass ratio). When the compound used was a silane coupling agent and when the organic binder used was ethylene ionomer, the solvent used was deionized water. The steel sheets Nos. 1 to 11 and 16 to 25 represented examples in which a compound layer containing a solid lubricant was provided. The steel sheets Nos. 12 and 13 represented examples in which a lubricating layer was provided. The steel sheet No. 14 represented an example in which a lubricating layer was provided on a compound layer. The steel sheet No. 15 represented an example in which no compound layer or no lubricating layer was provided.

The following solid lubricants, organic resin binders and compounds were used for the formation of the lubricating layers and the compound layers:

Silicone resin: KR-242A manufactured by Shin-Etsu Chemical Co., Ltd.

Polyethylene wax 1: Ceridust 3620 manufactured by Clariant (Japan) K.K.

Fluororesin: polytetrafluoroethylene resin Fluon L170J manufactured by ASAHI GLASS CO., LTD.

Molybdenum disulfide: LM-13 manufactured by DAITOU CO., LTD.

Graphite: GP-60S manufactured by Hitachi Chemical Co., Ltd.

Boron nitride: FS-1 manufactured by MIZUSHIMA FERROALLOY CO., LTD.

Diethanol-modified epoxy resin: ER-007 manufactured by Kansai Paint Co., Ltd.

Blocked isocyanate: DURANATE MF-K60X manufactured by Asahi Kasei Corporation

Ethylene ionomer: CHEMIPEARL 5650 manufactured by Mitsui Chemicals, Inc.

Polyethylene wax 2: CHEMIPEARL W950 manufactured by Mitsui Chemicals, Inc.

Silane coupling agent: KBE-403 manufactured by Shin-Etsu Chemical Co., Ltd.

The steel sheets Nos. 1 to 25 described in Tables 4 and 5 were tested by the following methods to evaluate cold pressing properties, corrosion perforation resistance after hot pressing, and adhesion to a coating. Hot pressing was simulated by heating the steel sheet with an electric furnace or by directly passing a current under heating conditions described in Table 4 or 5, and thereafter sandwiching the steel sheet between Al-made mold sections to cool the steel sheet at a cooling rate described in Table 1 or 2.

Cold pressing properties: Cold pressing properties were evaluated by measuring the dynamic friction coefficient with a friction coefficient measuring apparatus schematically illustrated in FIG. 1. First, a sample 1 obtained from the manufactured steel sheet was placed on a sample table 2 fixed on the upper surface of a slide table 3. The slide table 3 was horizontally movable by rollers 4 provided on the upper surface of a slide table support 5 that was located under the slide table. Next, the slide table support 5, which was vertically movable, was elevated to press the sample 1 against the lower surface of a bead 6 which was located above the sample and had a shape shown in FIG. 2. The pressure load N applied to the sample 1 was measured by a first load cell 7 fitted to the slide table support 5. Lastly, the slide table 3 was horizontally moved on rails 9 at a travel velocity of 100 cm/min while a predetermined pressure load N (=400 kgf) was applied to the sample, and the sliding frictional force F was measured with a second load cell 8 which was fitted to one end of the slide table 3. The dynamic friction coefficient μ=F/N at room temperature (25° C.) was determined. Prior to the testing, the surface of the sample 1 was coated with a lubricant oil which was press washing oil PRETON R352L manufactured by Sugimura Chemical Industrial Co., Ltd. The calculated μ value was evaluated on the basis of the following criteria. The symbols ⊙ and ○ indicate that cold pressing properties were excellent.

⊙: μ<0.1
○: 0.1≤μ<0.15
Δ: 0.15≤μ<0.2
×: 0.2≤μ

Corrosion perforation resistance: To evaluate the resistance to corrosion perforation expected to occur at portions which would be difficult for a phosphating or an electroplated coating to be deposited with uniformity, a tape was applied to a sample obtained from the heat-treated steel sheet to seal backs and ends of the sample which were to be excluded from the testing. Thereafter, the sample was subjected to 150 cycles of a complex corrosion test in which one cycle consisted of spraying a salt water (a 5 mass % aqueous NaCl solution, 35° C., 2 h)→drying (60° C., relative humidity 20-30%, 4 h)→wetting (50° C., relative humidity 95%, 2 h). The maximum decrease in the sheet thickness of the sample after the test was measured and evaluated on the basis of the following criteria. The symbols ⊙, ○ and Δ indicate that corrosion resistance was satisfied.

⊙: Maximum decrease in sheet thickness 0.1 mm
○: 0.1 mm<Maximum decrease in sheet thickness≤0.2 mm
Δ: 0.2 mm<Maximum decrease in sheet thickness≤0.3 mm
×: 0.3 mm<Maximum decrease in sheet thickness Adhesion to coating: A sample was obtained from the heat-treated steel sheet and was subjected to a phosphating under standard conditions using PB-SX35 manufactured by Nihon Parkerizing Co., Ltd. Thereafter, electrodeposition paint GT-10HT Gray manufactured by Kansai Paint Co., Ltd. was deposited and baked at 170° C. for 20 minutes to form a film with a thickness of 20 μm, thereby producing a painted test piece. The surface of the test piece which had been subjected to the phosphating and the electrodeposition coating was cut with a cutter knife to a depth reaching the base steel to form a lattice pattern (10×10 squares with 1 mm intervals). An adhesive tape was applied to and peeled from the lattice pattern. The result of this cross-cut adhesion test was evaluated on the basis of the following criteria. The symbols ⊙ and ○ indicate that the adhesion to a coating was excellent.

⊙: No squares were peeled off
○: 1 to 10 squares were separated.
Δ: 11 to 30 squares were separated.
×: 31 or more squares were separated.

The results are described in Table 6. The results show that our steel sheets were excellent in cold pressing properties and corrosion perforation resistance after being hot pressed, as well as in terms of the adhesion to a coating.

In this EXAMPLE, cold pressing or hot pressing was not actually carried out. However, as described hereinabove, the corrosion perforation resistance and the adhesion to a coating are susceptible to changes in the coating layer caused by heating before hot pressing, in particular the behavior of Zn in the coating layer. Accordingly, the results in this EXAMPLE qualify to be used for the evaluation of the hot pressed members in terms of corrosion perforation resistance and adhesion to a coating.

TABLE 4

| Steel sheet No. | Coating layer I | | Coating layer II | | | Compound layer | | | | Lubricating layer |
| | Ni content (mass %) | Mass per unit area (g/m$^2$) | Ni content (mass %) | Mass per unit area (g/m$^2$) | η-phase content (mass %) | Compound | Solid lubricant | Solid lubricant content (mass %) | Thickness (μm) | Organic binder |
| --- | --- | --- | --- | --- | --- | --- | --- | --- | --- | --- |
| 1 | 100 | 0.05 | 12 | 45 | 0 | Silicone resin | Polyethylene wax 1 | 5 | 0.5 | — |
| 2 | 100 | 0.05 | 12 | 45 | 0 | Silicone resin | Fluororesin | 5 | 0.5 | — |
| 3 | 100 | 0.05 | 12 | 45 | 0 | Silicone resin | Molybdenum disulfide | 5 | 0.5 | — |
| 4 | 100 | 0.05 | 12 | 45 | 0 | Silicone resin | Graphite | 5 | 0.5 | — |
| 5 | 100 | 0.05 | 12 | 45 | 0 | Silicone resin | Boron nitride | 5 | 0.5 | — |
| 6 | 100 | 0.05 | 12 | 45 | 0 | Silicone resin | Polyethylene wax 1 | 0.1 | 0.5 | — |
| 7 | 100 | 0.05 | 12 | 45 | 0 | Silicone resin | Polyethylene wax 1 | 1 | 0.5 | — |
| 8 | 100 | 0.05 | 12 | 45 | 0 | Silicone resin | Polyethylene wax 1 | 10 | 0.5 | — |
| 9 | 100 | 0.05 | 12 | 45 | 0 | Silicone resin | Polyethylene wax 1 | 20 | 0.5 | — |
| 10 | 100 | 0.05 | 12 | 45 | 0 | Silicone resin | Polyethylene wax 1 | 5 | 0.1 | — |
| 11 | 100 | 0.05 | 12 | 45 | 0 | Silicone resin | Polyethylene wax 1 | 5 | 2 | — |
| 12 | 100 | 0.05 | 12 | 45 | 0 | — | — | — | — | Diethanol modified epoxy resin + blocked isocyanate |
| 13 | 100 | 0.05 | 12 | 45 | 0 | — | — | — | — | Ethylene ionomer |
| 14 | 100 | 0.05 | 12 | 45 | 0 | Silane coupling agent | — | — | 0.5 | Ethylene ionomer |

TABLE 4-continued

|  |  | Lubricating layer | | Heating conditions | | | | |
|---|---|---|---|---|---|---|---|---|
| Steel sheet No. | Solid lubricant | Solid lubricant content (mass %) | Thickness (μm) | Average temperature increase rate (° C./s) | Heating temperature (° C.) | Holding time (s) | Cooling rate (° C./s) | Remarks |
| 1 | — | — | — | 20 | 900 | 0 | 50 | Ex. |
| 2 | — | — | — | 20 | 900 | 0 | 50 | Ex. |
| 3 | — | — | — | 20 | 900 | 0 | 50 | Ex. |
| 4 | — | — | — | 20 | 900 | 0 | 50 | Ex. |
| 5 | — | — | — | 20 | 900 | 0 | 50 | Ex. |
| 6 | — | — | — | 20 | 900 | 0 | 50 | Ex. |
| 7 | — | — | — | 20 | 900 | 0 | 50 | Ex. |
| 8 | — | — | — | 20 | 900 | 0 | 50 | Ex. |
| 9 | — | — | — | 20 | 900 | 0 | 50 | Ex. |
| 10 | — | — | — | 20 | 900 | 0 | 50 | Ex. |
| 11 | — | — | — | 20 | 900 | 0 | 50 | Ex. |
| 12 | Polyethylene wax 1 | 5 | 0.5 | 20 | 900 | 0 | 50 | Ex. |
| 13 | Polyethylene wax 2 | 5 | 0.5 | 20 | 900 | 0 | 50 | Ex. |
| 14 | Polyethylene wax 2 | 5 | 0.5 | 20 | 900 | 0 | 50 | Ex. |

TABLE 5

| | Coating layer I | | Coating layer II | | | Compound layer | | | | |
|---|---|---|---|---|---|---|---|---|---|---|
| Steel sheet No. | Ni content (mass %) | Mass per unit area (g/m²) | Ni content (mass %) | Mass per unit area (g/m²) | η-phase content (mass %) | Compound | Solid lubricant | Solid lubricant content (mass %) | Thickness (μm) | Lubricating layer Organic binder |
| 15 | 100 | 0.05 | 12 | 45 | 0 | — | — | — | — | — |
| 16 | 60 | 0.05 | 12 | 45 | 0 | Silicone resin | Polyethylene wax 1 | 5 | 0.5 | — |
| 17 | 100 | 0.01 | 12 | 45 | 0 | Silicone resin | Polyethylene wax 1 | 5 | 0.5 | — |
| 18 | 100 | 0.5 | 12 | 45 | 0 | Silicone resin | Polyethylene wax 1 | 5 | 0.5 | — |
| 19 | 100 | 5 | 12 | 45 | 0 | Silicone resin | Polyethylene wax 1 | 5 | 0.5 | — |
| 20 | 100 | 0.05 | 10 | 45 | 0 | Silicone resin | Polyethylene wax 1 | 5 | 0.5 | — |
| 21 | 100 | 0.05 | 18 | 45 | 0 | Silicone resin | Polyethylene wax 1 | 5 | 0.5 | — |
| 22 | 100 | 0.05 | 25 | 45 | 0 | Silicone resin | Polyethylene wax 1 | 5 | 0.5 | — |
| 23 | 100 | 0.05 | 12 | 10 | 0 | Silicone resin | Polyethylene wax 1 | 5 | 0.5 | — |
| 24 | 100 | 0.05 | 12 | 60 | 0 | Silicone resin | Polyethylene wax 1 | 5 | 0.5 | — |
| 25 | 100 | 0.05 | 12 | 90 | 0 | Silicone resin | Polyethylene wax 1 | 5 | 0.5 | — |

| | | Lubricating layer | | Heating conditions | | | | |
|---|---|---|---|---|---|---|---|---|
| Steel sheet No. | Solid lubricant | Solid lubricant content (mass %) | Thickness (μm) | Average temperature increase rate (° C./s) | Heating temperature (° C.) | Holding time (s) | Cooling Rate (° C./s) | Remarks |
| 15 | — | — | — | 20 | 900 | 0 | 50 | Comp. Ex. |
| 16 | — | — | — | 20 | 900 | 0 | 50 | Ex. |
| 17 | — | — | — | 20 | 900 | 0 | 50 | Ex. |
| 18 | — | — | — | 20 | 900 | 0 | 50 | Ex. |
| 19 | — | — | — | 20 | 900 | 0 | 50 | Ex. |
| 20 | — | — | — | 20 | 900 | 0 | 50 | Ex. |
| 21 | — | — | — | 20 | 900 | 0 | 50 | Ex. |
| 22 | — | — | — | 20 | 900 | 0 | 50 | Ex. |
| 23 | — | — | — | 20 | 900 | 0 | 50 | Ex. |
| 24 | — | — | — | 20 | 900 | 0 | 50 | Ex. |
| 25 | — | — | — | 20 | 900 | 0 | 50 | Ex. |

TABLE 6

| Steel sheet No. | Cold pressing properties | Corrosion perforation Resistance | Adhesion with coating | Remarks |
|---|---|---|---|---|
| 1 | ⊚ | ○ | ⊚ | Ex. |
| 2 | ⊚ | ○ | ⊚ | Ex. |
| 3 | ○ | ○ | ○ | Ex. |
| 4 | ○ | ○ | ○ | Ex. |
| 5 | ○ | ○ | ○ | Ex. |
| 6 | ○ | ○ | ⊚ | Ex. |
| 7 | ○ | ○ | ○ | Ex. |
| 8 | ⊚ | ○ | ⊚ | Ex. |
| 9 | ⊚ | ○ | ○ | Ex. |
| 10 | ○ | ○ | ⊚ | Ex. |
| 11 | ⊚ | ○ | ○ | Ex. |
| 12 | ⊚ | ○ | ○ | Ex. |
| 13 | ⊚ | ○ | ○ | Ex. |
| 14 | ⊚ | ○ | ○ | Ex. |
| 15 | △ | ○ | △ | Comp. Ex. |
| 16 | ⊚ | △ | ⊚ | Ex. |
| 17 | ⊚ | △ | ⊚ | Ex. |
| 18 | ⊚ | ○ | ⊚ | Ex. |
| 19 | ⊚ | ○ | ⊚ | Ex. |
| 20 | ⊚ | ○ | ⊚ | Ex. |
| 21 | ⊚ | ○ | ⊚ | Ex. |
| 22 | ⊚ | ○ | ⊚ | Ex. |
| 23 | ⊚ | △ | ⊚ | Ex. |
| 24 | ⊚ | ○ | ⊚ | Ex. |
| 25 | ⊚ | ⊚ | ⊚ | Ex. |

The invention claimed is:

1. A hot-pressing steel sheet comprising:
a Ni—Zn alloy layer on a surface of a steel sheet, the Ni—Zn alloy layer containing 10 to 25 mass % of Ni and a balance of Zn and inevitable impurities and having a mass per unit area of 10 to 90 g/m$^2$; and
a lubricating layer provided directly on a surface of the Ni—Zn alloy layer, the lubricating layer consisting of a solid lubricant, an organic resin serving as a binder, and optionally a curing agent,
wherein the amount of the solid lubricant in the lubricating layer is 1 to 10 parts by mass in terms of solid content with respect to 100 parts by mass in terms of solid content of a composition containing the organic resin serving as the binder in the lubricating layer.

2. The hot-pressing steel sheet according to claim 1, wherein the steel sheet which is a substrate for the Ni—Zn alloy layer has a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance.

3. The hot-pressing steel sheet according to claim 2, wherein the steel sheet which is a substrate for the Ni—Zn alloy layer further contains, in terms of mass %, at least one selected from Cr: 0.01 to 1%, Ti: not more than 0.2% and B: 0.0005 to 0.08%.

4. The hot-pressing steel sheet according to claim 3, wherein the steel sheet which is a substrate for the Ni—Zn alloy layer further contains, in terms of mass %, Sb: 0.003 to 0.03%.

5. The hot-pressing steel sheet according to claim 2, wherein the steel sheet which is a substrate for the Ni—Zn alloy layer further contains, in terms of mass %, Sb: 0.003 to 0.03%.

6. The hot-pressing steel sheet of claim 1, wherein the solid lubricant is selected from the group consisting of a polyolefin wax, a paraffin wax, a fluororesin, a graphite and a boron nitride.

7. The hot-pressing steel sheet of claim 1, wherein the hot-pressing steel sheet consists essentially of two layers on the steel sheet.

8. A process of manufacturing a hot pressed member comprising:
cold pressing the hot-pressing steel sheet according to claim 1,
thereafter heating the cold pressed steel to a temperature of an Ac$_3$ transformation temperature to 1000° C., and
hot pressing the steel.

9. A hot-pressing steel sheet comprising:
a coating layer on a surface of a steel sheet, the coating layer containing 10 to 25 mass % of Ni and a balance of Zn and inevitable impurities and having a mass per unit area of 10 to 90 g/m$^2$;
a lubricating layer on a surface of the coating layer, the lubricating layer containing a solid lubricant; and
at least one compound layer selected from the group consisting of 1) a Si-containing compound layer containing one of silicone resin, lithium silicate, silicate soda, and silane coupling agent, 2) a Ti-containing compound layer, 3) an Al-containing compound layer, and 4) a Zr-containing compound layer, said compound layer being between the coating layer and the lubricating layer.

10. A hot-pressing steel sheet comprising:
a coating layer on a surface of a steel sheet, the coating layer containing 10 to 25 mass % of Ni and a balance of Zn and inevitable impurities and having a mass per unit area of 10 to 90 g/m$^2$; and
at least one compound layer on a surface of the coating layer, the compound layer containing a solid lubricant and selected from the group consisting of 1) a Si-containing compound layer containing one of silicone resin, lithium silicate, silicate soda, and silane coupling agent, 2) a Ti-containing compound layer, 3) an Al-containing compound layer and 4) a Zr-containing compound layer,
wherein the amount of the solid lubricant in the compound layer is 1 to 20 parts by mass in terms of solid content with respect to 100 parts by mass in terms of solid content of a compound of the compound layer.

11. The hot-pressing steel sheet of claim 10, wherein the solid lubricant is selected from the group consisting of a polyolefin wax, a paraffin wax, a fluororesin, a graphite and a boron nitride.

12. A hot-pressing steel sheet comprising:
a Ni—Zn alloy layer I on a surface of a steel sheet, the Ni—Zn alloy layer I containing not less than 60 mass % of Ni and a balance of Zn and inevitable impurities and having a mass per unit area of 0.01 to 5 g/m$^2$;
a coating layer II on a surface of the Ni—Zn alloy layer I, the coating layer II containing 10 to 25 mass % of Ni and a balance of Zn and inevitable impurities and having a mass per unit area of 10 to 90 g/m$^2$; and
a lubricating layer provided directly on a surface of the coating layer II, the lubricating layer consisting of a solid lubricant, an organic resin serving as a binder, and optionally a curing agent, and
wherein the amount of the solid lubricant in the lubricating layer is 1 to 10 parts by mass in terms of solid content with respect to 100 parts by mass in terms of solid content of a composition consisting of the organic resin serving as the binder in the lubricating layer.

13. The hot-pressing steel sheet according to claim 12, wherein the steel sheet which is a substrate for the coating layers has a component composition which is represented by, in terms of mass %, C: 0.15 to 0.5%, Si: 0.05 to 2.0%, Mn: 0.5 to 3%, P: not more than 0.1%, S: not more than 0.05%, Al: not more than 0.1%, N: not more than 0.01%, and Fe and inevitable impurities: balance.

14. The hot-pressing steel sheet according to claim 13, wherein the steel sheet which is a substrate for the coating layers further contains, in terms of mass %, at least one selected from Cr: 0.01 to 1%, Ti: not more than 0.2% and B: 0.0005 to 0.08%.

15. The hot-pressing steel sheet according to claim 14, wherein the steel sheet which is a substrate for the coating layers further contains, in terms of mass %, Sb: 0.003 to 0.03%.

16. The hot-pressing steel sheet according to claim 13, wherein the steel sheet which is a substrate for the coating layers further contains, in terms of mass %, Sb: 0.003 to 0.03%.

17. The hot-pressing steel sheet of claim 12, wherein the hot-pressing steel sheet consists essentially of three layers on the steel sheet.

18. A process of manufacturing a hot pressed member comprising:
cold pressing the hot-pressing steel sheet according to claim 12,
thereafter heating the cold pressed steel to a temperature of an $Ac_3$ transformation temperature to 1000° C., and hot pressing the steel.

19. The process according to claim 18, wherein the cold pressed steel is heated to a temperature of an $Ac_3$ transformation temperature to 1000° C. at an average temperature increase rate of not less than 100° C/s.

20. A hot-pressing steel sheet comprising:
a coating layer I on a surface of a steel sheet, the coating layer I containing not less than 60 mass % of Ni and a balance of Zn and inevitable impurities and having a mass per unit area of 0.01 to 5 $g/m^2$;
a coating layer II on a surface of the coating layer I, the coating layer II containing 10 to 25 mass % of Ni and a balance of Zn and inevitable impurities and having a mass per unit area of 10 to 90 $g/m^2$;
a lubricating layer on a surface of the coating layer II, the lubricating layer containing a solid lubricant;
at least one compound layer selected from the group consisting of 1) a Si-containing compound layer containing one of silicone resin, lithium silicate, silicate soda, and silane coupling agent, 2) a Ti-containing compound layer, 3) an Al-containing compound layer, and 4) aZr-containing compound layer between the coating layer II and the lubricating layer.

21. A hot-pressing steel sheet comprising:
a coating layer I on a surface of a steel sheet, the coating layer I containing not less than 60 mass % of Ni and a balance of Zn and inevitable impurities and having a mass per unit area of 0.01 to 5 $g/m^2$;
a coating layer II on a surface of the coating layer I, the coating layer II containing 10 to 25 mass % of Ni and a balance of Zn and inevitable impurities and having a mass per unit area of 10 to 90 $g/m^2$; and
at least one compound layer on a surface of the coating layer II, the compound layer containing a solid lubricant and selected from the group consisting of 1) a Si-containingcompound layer containing one of silicone resin, lithium silicate, silicate soda, and silanecoupling agent, 2) a Ti-containing compound layer, 3) an Al-containing compound layer, and 4) aZr-containing compound layer.

* * * * *